United States Patent [19]

Koechner

[11] Patent Number: 4,788,436
[45] Date of Patent: Nov. 29, 1988

[54] RADIATION SENSITIVE OPTICAL FIBER AND DETECTOR

[76] Inventor: Walter Koechner, 1054 Harriman St., Great Falls, Va. 22066

[21] Appl. No.: 158,072

[22] Filed: Feb. 12, 1988

Related U.S. Application Data

[63] Continuation of Ser. No. 946,611, Dec. 24, 1986, abandoned, which is a continuation of Ser. No. 787,027, Oct. 15, 1986, abandoned, which is a continuation-in-part of Ser. No. 615,281, May 30, 1984, abandoned.

[51] Int. Cl.$^4$ ............................ G02B 5/172; G01J 5/08
[52] U.S. Cl. .............................. 250/485.1; 250/483.1; 250/227; 350/96.34
[58] Field of Search ............... 250/483.1, 484.1, 485.1, 250/486.1, 487.1, 227, 368, 361 R; 350/96.33, 96.29, 96.30, 96.34

[56]  References Cited

U.S. PATENT DOCUMENTS

| | | | |
|---|---|---|---|
| 3,225,193 | 12/1965 | Hilton et al. | 250/227 |
| 3,457,180 | 7/1969 | Ilretz et al. | 250/483.1 |
| 4,240,747 | 12/1980 | Harmer et al. | 350/133 |
| 4,298,802 | 11/1981 | Quella et al. | 250/486.1 |
| 4,413,184 | 11/1983 | Marrone | 250/368 |
| 4,415,810 | 11/1983 | Brown, Sr. | 250/484.1 |
| 4,467,208 | 8/1984 | Müller et al. | 250/483.1 |
| 4,471,223 | 9/1984 | Hurst et al. | 250/357.1 |
| 4,544,235 | 10/1985 | Nashida et al. | 350/96.34 |
| 4,552,431 | 11/1985 | Allemand et al. | 350/96.34 |

FOREIGN PATENT DOCUMENTS

| | | | |
|---|---|---|---|
| 57-50672 | 3/1982 | Japan | 250/386 |
| 0076466 | 5/1982 | Japan | 250/368 |

OTHER PUBLICATIONS

Swinth et al., Biomedical Probe Using a Fiber Optic Coupled Scintillator, Med. Phys. vol. 3, No. 2, Mar.-/Apr. 1976.

Primary Examiner—Bruce C. Anderson
Assistant Examiner—Paul A. Guss
Attorney, Agent, or Firm—Watson, Cole, Grindle & Watson

[57]  ABSTRACT

An optical fiber sensitive to nuclear radiation includes a thin filament core formed of a plastic scintillator material which scintillates in the presence of nuclear radiation. An optical cladding material is provided around the optical fiber. A second fiber is connected to the optical fiber for efficiently transmitting the scintillating light from the optical fiber to a radiation detector.

3 Claims, 3 Drawing Sheets

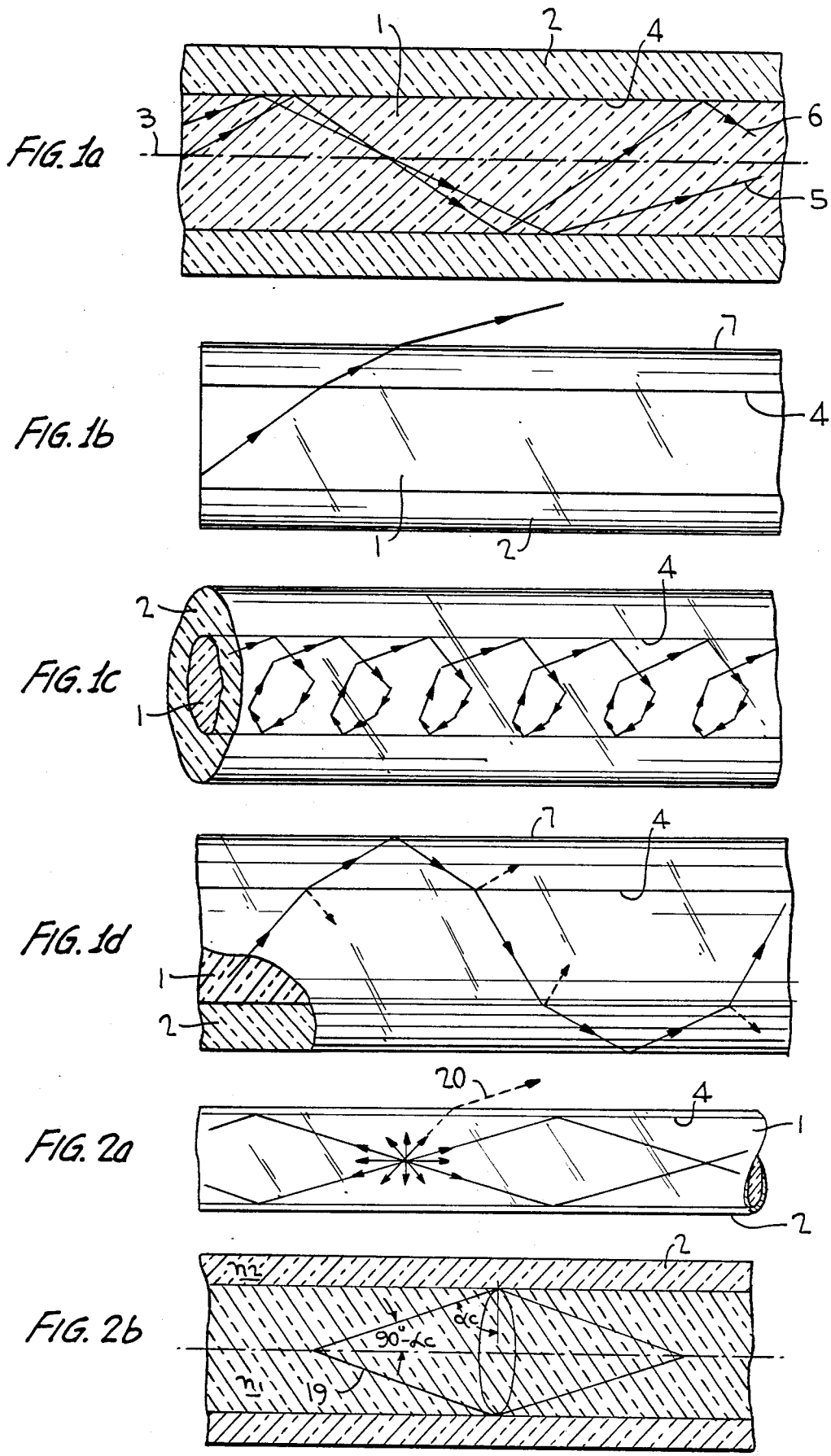

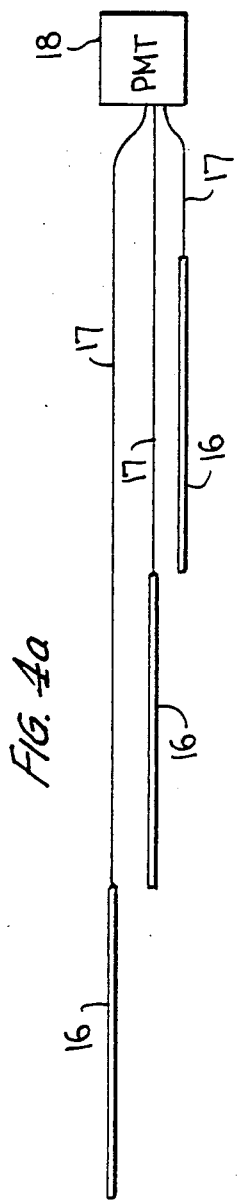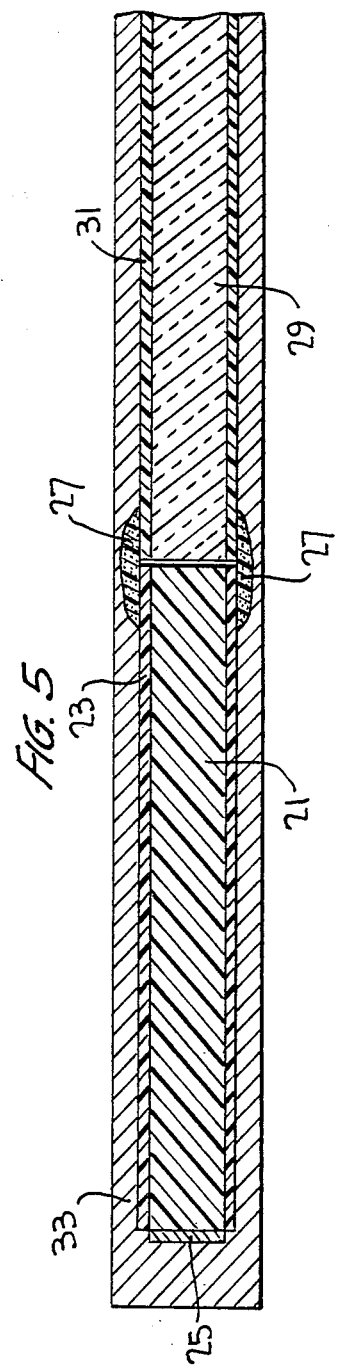
FIG. 4a
FIG. 5

RADIATION SENSITIVE OPTICAL FIBER AND DETECTOR

This application is a continuation, of application Ser. No. 946,611, filed Dec. 24, 1986 abandoned as a continuation of Ser. No. 787,027, filed Oct. 15, 1986 abandoned as a continuation-in-part of Ser. No. 615,281, filed May 30, 1984 abandoned.

RELATED APPLICATION

This application relates to U.S. Ser. No. 615,336, filed May 30, 1984, and commonly owed herewith.

BACKGROUND OF THE INVENTION

1. Field of the Invention

This invention concerns nuclear radiation dose rate meters utilizing a plastic scintillator material wherein the high sensitivity of a scintillator is combined with the low loss propagation capability of an optical fiber.

2. Description of the Prior Art

The darkening of optical materials upon exposure to ionizing radiation is a well-known phenomenon. The highest degree of darkening is found in lead-silicate fibers. It can be concluded that radiation induced color changes and their attenuating affects on light transmission are large at short wavelengths and decrease monotonically to very small affects at larger wavelengths.

The formation of radiation-induced color centers in optical fibers creates darkened or colored areas which give rise to not only increased light attenuation but also to decreased luminescent light generation within such fibers. The most extensively studied effect of ionizing radiation on optical fibers has been signal attenuation due to the production of defect centers which absorb the light transmitted by the fibers.

The spectral character of the optical absorption produced by steady-state and pulsed ionizing radiation in all types of optical fibers has been investigated by many researchers. It can generally be concluded that the most radiation-resistant fibers, that is, resistant to the formation of color defect centers, are formed of high purity synthetic silica, highly doped silica, cerium protected silicate glasses and plastics such as polystyrene.

The high radiation sensitivity of lead-doped silicate fibers has been used to advantage for radiation dosimeters using an optical fiber as a sensing element. Glasses have been successfully employed in block-form as radiation dosimeters for high dose levels. However, the poor optical quality and limited size of the glass block dosimeters have restricted the application of these devices.

Glass optical fibers greatly reduce the problems encountered with bulk glass dosimeters. A combination of low intrinsic optical loss and a greatly increased optical path length permit enhanced radiation sensitivity in optical fibers of at least two orders of magnitude compared to conventional glass block dosimeters. In addition, because of the flexibility and small size of the fibers, the sensing element can be confined to a very small volume.

Dosimeters are based either on a highly sensitive transmission measurement of the fiber or are based on comparing the color of two fibers in a personal dosimeter. Also, radiation induced luminescence has been suggested for application in radiation dosimeters.

Many solid and liquid substances show luminescence when exposed to ionizing radiation. The most important groups of scintillators in use today are the organic crystals of the hydrocarbon type, the inorganic crystals and powders of the alkali halide and zinc sulfide types, and liquid and plastic solutions with most hydrocarbon solutes. Noble gas and glass scintillators have also been investigated.

Scintillators that are of particular value for nuclear physics applications are those that exhibit transparency for the emitted light, with correspondingly high gamma and X-ray sensitivity and fast response. High sensitivity results in increased scintillation and light generation at such wavelengths. From the group of inorganic crystals, sodium iodide is the most efficient scintillator for the detection of X-radiation and gamma radiation known today. Liquid and plastic scintillators, although not quite as efficient as NaI, have a number of advantages.

A category of useful scintillators is produced by dissolving an organic scintillator in an appropriate solvent. Liquid scintillators are often sold commercially in sealed glass containers and are handled in the same manner as solid scintillators. In certain applications, large-volume detectors with dimensions of several meters may be required. Liquid scintillators are also widely applied to count nuclear radiation emissions associated with materials which can be dissolved as part of the scintillator solution. The technique is widely used for counting low level beta activity, such as that from carbon-14.

If an organic scintillator is dissolved in a solvent which can be then subsequently polymerized, the equivalent of a solid solution can be produced. The most common example is a solvent of styrene monomer or polyvinyltoluene (PVT) in which an appropriate organic scintillator, such as 2,5 diphenylloxazole (PPO) is dissolved. The styrene or PVT is then polymerized to form a solid plastic.

Because of the ease with which plastics can be shaped and fabricated, they have become an extremely useful form of organic scintillator. Plastic scintillators are available commercially with a good selection of standard sizes of rods, cylinders, and flat sheets.

Scintillators emit radiation as a result of gamma photon flux and, therefore, they are primarily used with dose rate counters. The most important interactions which can occur in a scintillator is the absorption of gamma photons. The Compton effect, which describes the elastic collision between a gamma ray photon and an electron of the scintillator material, is one type of such interaction. The photo-electric effect, wherein a gamma photon incident on an atom is absorbed and a photo-electron is ejected from the atom, is another type of such interaction. Yet another type of such interaction is pair production, where the energy of an incident gamma-photon exceeds $2mc=1.02$ MeV. The photon is completely absorbed and the energy is converted into rest energy $2mc$ and kinetic energy of an electron-positron pair.

Conventional scintillation counters include one or several photomultiplier tubes directly attached to the scintillator material. The scintillator material may be a crystal, liquid or plastic housed in a light-tight enclosure.

Radiation sensitive fibers are known as having an inner core of glass and a cladding of plastic (U.S. Pat. No. 4,415,810) or an inner core of plastic and a cladding of glass (U.S. Pat. No. 4,467,208).

Typically, for a fiber having a glass core and a plastic cladding, a resin, polymer or monomer, etc., is applied in liquid form to a glass filament. The plastic is then quickly cured by heating. Because the glass core has a very high melting temperature, compared to the plastic, this curing process of the cladding has a detrimental effect on the glass.

Furthermore, glass is chemically inert and much harder than the cladding. The higher melting temperature, chemical inertness and relative hardness make the application of a plastic cladding tedious and produces a resulting fiber having low sensitivity to nuclear radiation. And, a fiber with a glass core and a plastic cladding is most commonly used as an optical fiber for communication purposes. Susceptibility to nuclear radiation is an undesirable side effect. Some glasses are more susceptible to nuclear radiation than others, but even the most sensitive glasses are many more orders of magnitude less sensitive compared to plastic scintillator materials.

And, a fiber with a plastic core and a glass cladding may meet the sensitivity requirement, but only short pieces can be made in a labor-intensive hand operation. Actually, only a few liquid filled capillary glass tubes are known to have been produced in a laboratory. A plastic core material requires forcing the polymer into the glass tube before polymerization. It is impossible to do this with capillary tubes which are smaller than 1 mm in diameter.

SUMMARY OF THE INVENTION

A highly sensitive gamma ray detector according to the invention uses a scintillating optical fiber for signal generation. The scintillating optical fiber is coupled to an ultraviolet light transmitting glass fiber for propagation of scintillation signals to a detector.

It is therefore an object of the invention to fabricate an optical fiber from a plastic scintillator material, thus combining the functions of a continuous signal generator and a signal propagation medium. This requires forming by for example, drawing, a long filament during a polymerization process of the scintillator material, surrounding the filament with a suitable optical cladding of low refractive index, coating the fiber with an opaque coating and coupling light generated by scintillation into an optical fiber suitable for long distance transmission to a photomultiplier.

In accordance with this objective of the invention, an optical fiber sensitive to nuclear radiation comprises a thin and elongated filament core adapted to scintillate in the presence of the nuclear radiation, and the core comprises a plastic material consisting of either polyvinyltoluene doped with organic scintillator material, or styrene doped with organic scintillator material. The optical cladding surrounding the filament core comprises a low refractive index plastic material consisting of either polymethylacrylate (acrylic) or a fluorinated polymer.

The filament core of such an optical fiber may be optically connected to a standard glass fiber to efficiently propagate ultraviolet radiation therethrough.

A detector for perimeter or area detection of nuclear radiation is made possible by the use of the optical fiber according to the invention in which several of such fibers are respectively connected to a plurality of the standard glass fibers which are together connected to a detector unit.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts through the several views and wherein:

FIGS. 1a through 1d show different light propagation modes within an optical waveguide;

FIGS. 2a and 2b show the trapping of scintillation photons within an optical fiber;

FIGS. 4a through 4c show various configurations of the optical fibers for use as radiation detectors; and FIG. 5 shows the construction details of a scintillation optical fiber.

DETAILED DESCRIPTION OF THE PREFERRED EMBODIMENT

Figure 3A:
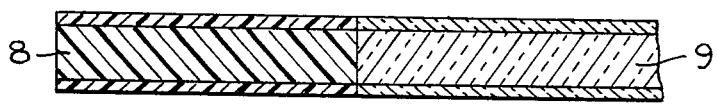
FIGS. 3a thorugh 3d show different types of optical coupling between optical fibers.

The light propagation characteristics of optical fibers and potential coupling schemes between a scintillator material and a low loss optical fiber will now be briefly described. To better understand the radiation sensor according to the invention, some fundamental concepts concerning mode propagation in optical waveguides will be discussed. The geometry of the core and cladding of the waveguide, as well as the refractive indices of the core, cladding and the surrounding media define the boundary conditions which determine the possible paths that a wave or ray may take within the waveguide. The specific paths consistent with these boundary conditions are called "modes."

The excitation of a particular mode determines the path through which light propagtes and depends upon the manner in which light is injected into the waveguide. Individual modes are distinguished by the different angles their ray paths form with the waveguide axis. Several of the more significant mode types are known as "bound core", "refractive", "leaky" and "clad" and are respectively shown in FIGS. 1a through 1d.

As shown in FIG. 1a, light rays are guided within the waveguide core 1. Core 1 is shown surrounded by cladding 2. To maintain as much light as possible within core 1, the refractive index $n_1$ of the core 1 should be larger than the refractive index $n_2$ of the cladding 2, that is $n_1 > n_2$. As further shown in FIG. 1a, a "bound" core mode is represented by ray 5 and ray 6 propagating at such an angle with respect to the waveguide axis 3 that they are totally internally reflected at the core cladding interface 4. The propagation angles of the rays 5 and 6 are less than some critical angle determined by the core and cladding refractive indices. The critical angle is the largest value which the angle of incidence may have for a ray of light passing from a denser to a less dense medium. If the angle of incidence exceeds the critical angle, the light ray will not enter the less dense medium but will be totally internally reflected back into the denser medium.

The bound core modes may be further caaracterized by the angle at which they propagate with respect to the waveguide axis. As this angle increases from zero to the critical angle, these modes change from lower order modes illustrated by ray 5 to higher modes illustrated by ray 6, as shown in FIG. 1a.

The total number of possible bound core modes increases as the diameter of the core increases and as the difference between refractive indices of the core 1 and the cladding 2 increases. If the diameter of the core 1 is small enough, and the refractive index difference between the core 1 and cladding 2 is small enough, then only one propagation mode can be supported in the waveguide. Under this condition, the waveguide is called a "single mode waveguide," in contrast to the case of a multimode fiber, where up to several thousand modes can be supported.

The light which propagates at angles greater than the critical angle with respect to the core waveguide axis 3 can, as illustrated in FIG. 1b, intercept the core-cladding interface 4 at such an angle that it is at first partially refracted at interface 4 and then is again partially refracted at the interface 7 between the cladding 2 and the surrounding medium. Only the refractive paths have been shown in FIG. 1b for clarity. Such a mode is called a "refractive mode."

The light which propagates at angles greater than the critical angle with respect to the core waveguide axis 3 can, as illustrated in FIG. 1c, for the case of a cylindrical waveguide or fiber, propagate in a skewed path such that the ray defining the path never passes through the axis 3 of the fiber. Such a mode is called a "leaky core" mode. The light can be trapped in the fiber for some distance before its power is dissipated and radiated away.

The light which propagates at angles greater than the critical angle with respect to the core waveguide axis 3 can, as illustrated in FIG. 1d, propagate at such an angle that at the core-cladding interface 4 it is partially refracted and partially reflected and at the cladding surrounding the medium interface 7 it is totally internally reflected. For the sake of clarity, only that part of the ray which is partially reflected is indicated. Such a mode is trapped within the core cladding system and is called a "clad" mode.

The light-trapping of photons in the fiber created by the scintillation process is illustrated in FIGS. 2a and 2b. The functional elements of an optical fiber are a normally cylindrical core 1, usually formed of silica-based glass, and a concentric cladding 2, formed of either glass or plastic. The core 1 has an index of refraction $n_1$ which is greater than the refractive index $n_2$ of the cladding 2. Total internal reflection occurs for all light rays where the critical angle of incidence, $\alpha_c$, at the core cladding interface 4 is exceeded as shown in FIG. 2a. The critical angle of incidence, $\alpha_c$, is related to the refractive indices via Snell's Law, i.e.

$$\sin\alpha_c = n_2/n.$$

The generation of optical photons by a gamma-photon is shown in FIG. 2b. A scattered gamma-photon generates optical photons isotropically. Only photons within an acceptance cone 19 in each direction defined by an apex angle of $(90\alpha_c)$ are trapped within the fiber. Light ray 20 is shown escaping through the cladding 2 since its angle of incidence at interface 4 is lesser than the critical angle $\alpha_c$.

The light transmission losses in a plastic scintillator are at least an order of magnitude higher compared with low loss glass fibers. Therefore it is desirable to combine the nuclear radiation sensitivity of a plastic scintillator with the superior light propagation characteristics of a glass fiber. A large number of coupling schemes between the scintillator material and the optical fiber are possible.

One approach is indicated in FIG. 3a which depicts the coupling or splicing of a self-contained optical fiber made from a plastic scintillator 8 with a conventional light carrying glass fiber 9.

Figure 3B:
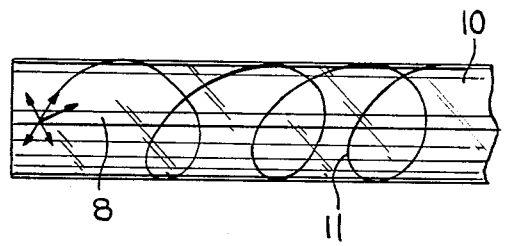

Another approach shown in FIG. 3b uses a filament formed of a scintillator material 8 as the core of the fiber. The scintillator filament 8 is surrounded by a low loss glass cladding 10. This approach relies on light generated in the core 8 to form skewed rays 11 via leaky modes which propagate in the cladding 10. As noted above, leaky modes do not cross the center of the fiber and are therefore not attenuated by the scintillator material 8.

Figure 3C:
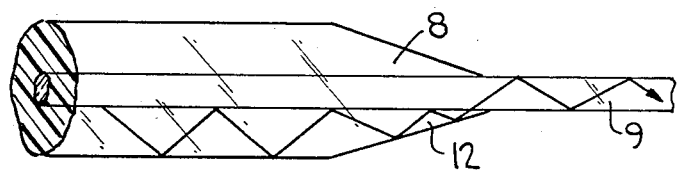

As shown in FIG. 3c, a scintillator material 8 forms the cladding around a conventional glass core fiber 9. The glass core 9 is surrounded by a light emitting cladding made from the plastic scintillator material 8. Light trapped in the scintillator cladding material 8 is coupled to the glass core 9 via tapered ends 12. This configuration is called prism coupling. The radiation stays trapped in the core 9 only if no further cladding is applied.

Figure 3D:
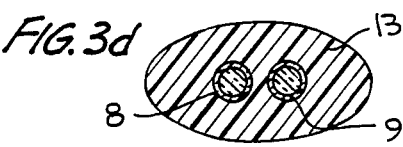

Yet another approach juxtaposes a filament scintillator material 8 and a glass fiber core 9 and surrounds each with a common cladding material 13. FIG. 3d shows this concept whereby light generated and trapped in the scintillator material core 8 is coupled via evanescent waves to the low loss glass fiber crre 9. Coupling and radiation exchange between cores 14 and 15 generally travels in both directions such that no advantage is gained.

Analysis has shown that an optimum configuration includes several fibers having a plastic scintillator core coupled to a UV transmitting optical fiber. The optimum length of the scintillator fiber is influenced by the self-absorption of the scintillating light in the fiber, the spatial extent of the nuclear radiation source to be detected such that the entire length of source will be covered by the fiber, and the strength of the nuclear signature, that is, the nuclear emission strength, relative to the background radiation.

Figure 4B:
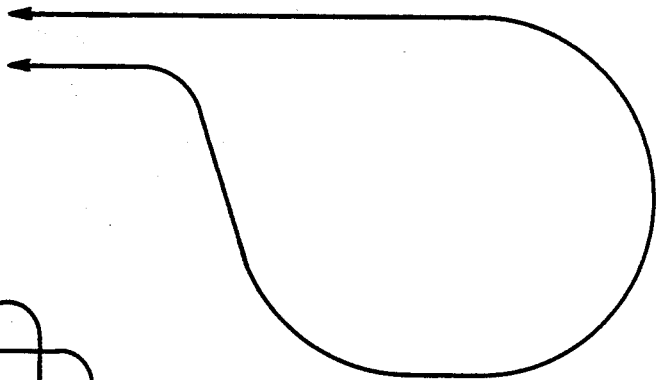

Plastic scintillators are not necesarily good light transmitters compared to fiber optic waveguides. The scintillators with the highest degree of light transmission are limited to a practical length of approximately 4 meters before light intensity drops to 10% of its initial value due to self absorption of light. In order to construct a line detector for detecting nuclear radiation along a line much longer than 4 meters, it is advantageous to couple individual lengths of scintillator fibers 16,16,16 to standard optical fibers 17,17,17 of different lengths as shown in FIG. 4a. In this way, a continuous line detector can be constructed. The use of several or many fibers does not present a handling problem and thus avoids a cumbersome configuration because of the small size of the individual fibers. Each of the optical fibers may then be connected to a detector unit 18, such as a photomultiplier tube as shown in FIGS. 4a through 4c.

The device can provide large area coverage with complete flexibility in selecting the particular shape of the area to be covered. For perimeter detection, fibers can be arranged around the area to be monitored as shown in FIG. 4b. On entering an area, building, etc., a radiation source crossing the fiber will trigger a response in the system. The fiber can also be laid out in a grid-like pattern to detect the movement of radioactive material within an area as shown in FIG. 4c.

Figure 4C:
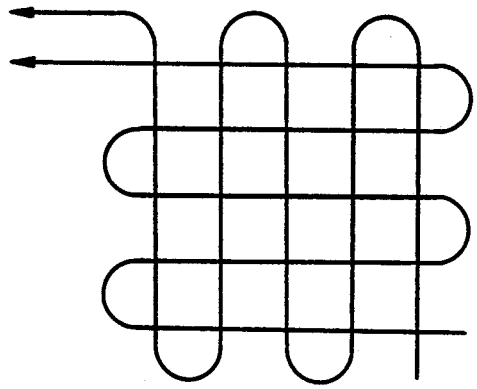

Each of the scintillation fibers shown in FIGS. 4a through 4c may be formed with a different scintillator material each sensitive to radiation within a different wavelength range so as to provide an increased range of measurement of nuclear radiation.

A fiber optic radiation detector can be permanently installed by burying the fibers underground in a suitably protected manner. Fiber sensors can also be installed under floor coverings (carpets, vinyl tiles) of commercial, industrial, residential and military buildings to provide unobtrusive monitoring of radiation material.

The radiation sensitive fiber according to the invention is made from filamnts of plastic scintillator material. The filaments are typically die-extrusions made from scintillator material prior to its polymerization. Typically, such fibers or filaments are formed of a base of polyvinyltoluene containing various amounts of organic scintillator materials, such as for example, 2,5-diphenyloxazole (PPO).

Most of these organic scintillators emit light in the ultraviolet (UV) range. For example, the maximum fluorescence peak of PPO is 363 nm. In order to reduce self-absorption of this short wavelength in the plastic scintillator and in order to better match the output wavelength of the scintillator materials to the sensitivity of photo-multipliers to which they may be coupled, spectrum shifters are used.

Commonly used spectrum shifters include bis-MSB p-bis-(O-methyl-styryl)-benzene, dimethyl-POPOP and POPOP. POPOP is the name for the organic material P-bis-[2-(5-phenyl-oxazoyl)]benzene. These wavelength shifters absorb the UV wavelengths emitted from the primary scintillator material and shift it to longer wavelengths, typically into the 410–440 nm region. Green and red emitting fluorescent materials are also available for such wavelength shifting.

After the plastic scintillator material has been shaped into long, thin filaments, a low refractive index optical cladding is applied to the scintillator material. This will establish the proper interface for efficient light propagation via internal reflections, i.e., with the cladding applied, the plastic scintillator material will become the core of an optical fiber. After the cladding process the scintillator fiber may be encapsulated in black PVC tubing for protection and light shielding. Also, a highly reflective coating such as a silver mirror coating is applied to one end of the fiber. The scintillation fiber is then spliced onto an optical fiber which exhibits superior light transmission properties at 430 nm.

As shown in FIG. 5, a scintillation fiber 21 is connected to a low loss light transmitting fiber 29. The scintillation fiber is die-extruded from a plastic scintillator material, such as, for example, Nuclear Enterprises Type NE110. The plastic scintillator core 21 is surrounded by a cladding 23 consisting of polymethylmethacrylate which is a transparent low refractive index acrylic material. In order to reflect as much light as possible to a detector such as a photomultiplier tube, the scintillation fiber has a reflective coating 25 (silver or gold) at one end. The other end is connected for example, epoxy-bonded as shown at 27, to a standard glass fiber 29, such as fiber Industries Type Superguide B. Standard glass fibers include a glass core surrounded by a polymer cladding 31. The whole assembly of fiber scintillator 21 and glass core fiber 29 is surrounded by a protective material 33 for handling and environmental protection. This outer layer 33, called a buffer, can be a plastic tube made from PVC or other suitable plastic which is either loosely fitted over the fiber assembly or bonded to it. The outer diameter of the final assembly may be dimensioned to, for example, 3 mm.

From the foregoing, it can be seen that the present invention relates to a radiation sensitive fiber which has a plastic core and a plastic cladding. The design and fabrication of such a fiber has significant implications with regard to performance, potential applications and manufacturing technology.

With the present radiation sensitive fiber maximum sensitivity is achieved because the fiber employs a plastic scintillator core. The fiber can be produced in long length (several hundred meters in one manufacturing operation), and the nuclear sensitive fiber can be drawn on a standard plastic fiber drawing machine employed for making regular light transmitting plastic fibers.

The core material of the nuclear radiation sensitive fiber of the invention consists of polyvinyltoluene doped with organic scintillator material or styrene doped with organic scintillator material, these materials being found compatible for the dyes of the scintillator material. And, the optical cladding surrounding the filament core consists of an acrylic (polymethylmethacrylate) or a fluorinated polymer. These selections of core and cladding materials produce a compatible combination of plastic scintillator material and plastic cladding material with the advantage that the fiber is very sensitive to nuclear radiation since it utilizes the most radiation sensitive material as a core. The radiation sensitive fiber can be drawn in large length on a standard fiber drawing machine. In this process, pellets of scintillator material are either cast or hot-extruded into a large cylinder (several inches in diameter, 10–15 inches long) of cladding material. The feed stock is mounted vertically high above the floor, the bottom part is heated with heat guns and a fiber is drawn. The fiber is an exact replica of the large cylinder filled with scintillator material, although the diameter is reduced about 20–50 times.

With the all plastic scintillator fiber of the invention, the core and cladding materials have substantially the same melting temperatures, the two materials are chemically inert so that they will not interact or copolymerize, the cladding material has a lower index of refraction compared to the core material, the cladding material has a low loss in optical wavelength, and the plastic core fiber is orders of magnitude more sensitive compared to a glass core fiber.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An optical fiber sensitive to nuclear radiation, comprising:
a thin and elongated filament core which is scintillatable in the presence of the nuclear radiation, said core comprising a plastic material selected from the group consisting of polyvinyltoluene doped with organic scintillator material and styrene doped with organic scintillator material, said organic scintillator material being selected from the group consisting of 2,5-diphenyl- oxazole (PPO) and bis-MSB p-bis-(0-methyl-styryl) - benzene, dimethyl-POPOP and POPOP, wherein POPOP is the name for the organic material P-bis-benzene;

an optical cladding surrounding said filament core, said cladding comprising a low refractive index plastic material consisting of polymethylacrylate; and an outer layer of opaque plastic material surrounding said optical cladding.

2. An optical fiber assembly highly sensitive to nuclear radiation, comprising:

a thin and elongated filament core which is scintillatable in the presence of the nuclear radiation;

an optical cladding surrounding said filament core;

an outer layer of opaque plastic material surrounding said optical cladding and overlying one end of said core;

said core and said cladding comprising plastic materials which are chemically inert and incapable of copolymerizing and have essentially the same melting temperature;

said cladding having a lower index of refraction than that of said core and having a low loss in optical wavelength;

said core material being selected from the group consisting of polyvinyltoluene doped with organic scintillator material and styrene doped with organic scintillator material, said organic scintillator material being selected from the group consisting of 2,5-diphenyl- oxazole (PPO) and bis-MSB p-bis-(0-methy-styryl) - benzene, dimethyl-POPOP and POPOP, wherein POPOP is the name for the organic material P-bis-benzene;

said cladding material consisting of polymethylacrylate; and a fiber optically connnected to an opposite end of said filament core and adapted to efficiently propagate ultraviolet radiation therethrough.

3. A detector for perimeter or area detection of nuclear radiation, comprising a plurality of first fibers each having a thin and elongated filament core which is scintillatable in the presence of the nuclear radiation to provide a signal corresponding to the nuclear radiation, an optical cladding surrounding each said filament core, an outer layer of opaque plastic material surrounding said optical cladding and overlying one end of each said core, said first fibers being respectively connected at each opposite end thereof to a plurality of second fibers each for efficiently transmitting ultraviolet radiation for improved propagation of said signal, a detector unit connected to said second fibers, said core and said cladding comprising plastic materials which are chemically inert and incapable of copolymerizing and have essentially the same melting temperature, said cladding having a lower index of refraction than that of said core and having a low loss in optical wavelength, said core material being selected from the group consisting of polyvinyltoluene doped with organic scintillator material and styrene doped with organic scintillator material, said organic scintillator material being selected from the group consisting of 2,5-diphenyl- oxazole (PPO) and bis-MSB p-bis-(0-methyl-styryl)-benzene, dimethyl-POPOP and POPOP, wherein POPOP is the name for the organic material P-bis-benzene, said cladding material consisting of polymethylacrylate.

* * * * *